Dec. 6, 1960 D. A. DE GRAAF 2,963,592

TRANSISTOR SWITCHING CIRCUIT

Filed May 11, 1956

INVENTOR
D. A. DE GRAAF
BY W. L. Keefauver
ATTORNEY

United States Patent Office 2,963,592
Patented Dec. 6, 1960

2,963,592

TRANSISTOR SWITCHING CIRCUIT

David A. De Graaf, Dover, N.J., assignor to Bell Telephone Laboratories, Incorporated, New York, N.Y., a corporation of New York Filed May 11, 1956, Ser. No. 584,379

9 Claims. (Cl. 307—88.5)

Figure 1A:
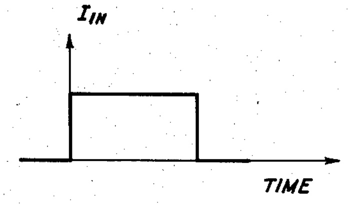

This invention relates to electronic switching circuits employing semi-conductor devices as active elements.

It has previously been known that solid state amplifying devices commonly called transistors can be employed as switches. For example, depending on the value of the current flowing in the base region of a transistor, its internal collector-to-emitter impedance can be rapidly increased or decreased from a value of the order of ohms in the low impedance condition, to an extremely high impedance condition of the order of several millions of ohms.

In other words, by control of the base current the output impedance of the transistor can be changed from a virtual short circuit to substantially an open circuit. This phenomenon, combined with the low power consumption and small size of transistors, has made the transistor a nearly ideal switch. The search for circuits, particularly for digital computers, in which the switching properties of the transistor can be utilized to best advantage has been intense.

Of the two general types of transistor presently available, namely the point contact and the junction type, the latter exhibits the higher ratio of high-to-low output impedance. The ratio for the point-contact transistor is of the order of tens of thousands while that for the junction transistor is of the order of millions. Therefore, at least at present, the junction transistor shows the greater promise as a switching device.

With both types of transistor there is one serious problem in their use as switching devices. This is the time of transition from one impedance condition to the other. Because transistors are composed of semiconductive material in which the number of free current carriers is small as compared to the number of carriers in materials classed as conductors, there is a certain sluggishness, or inertia of motion in the carriers both in "turning-on" and "turning-off." A transistor may be said to be "turned-on" when in the low impedance condition, and "turned-off" when in the high impedance condition.

The problem is particularly serious in the matter of "turn-off" time where the base current has been raised to such a level that saturation current flows in the collector circuit. Once the collector current reaches saturation more current carriers are injected into the base region from the emitter than are necessary to maintain the collector current at saturation level. Considerable time therefore, elapses before the collector current flow can be reversed after the current into the base has been reduced below the critical "turn-off" value. In fact, this phenomenon of sluggishness in the "turn-off" time has been called the "storage" effect, since those current carriers flowing from emitter-to-collector which are minority carriers in the base region are in effect "stored" in the base for an appreciable finite time after termination of the driving current pulse.

Prior art solutions to the problem of removing excess stored current carriers from the base region during the turn-off interval may be classified into circuits for preventing saturation during the on-time interval and circuits for driving the base more negative than otherwise required at the turn-off time by means of additional bias sources. An example of the first type of circuit is one in which the collector is clamped to a potential slightly above that at which saturation occurs. The combination of a battery and a diode in shunt with the collector-to-emitter path prevents the collector potential from falling below the level at which saturation begins. Similarly an appropriate clamping voltage can be applied to the base electrode to prevent its rising above the level at which the collector would be driven into saturation. Anti-saturation circuits of whatever type do avoid the storage effect, but only at the sacrifice of output power and efficiency otherwise obtainable from the circuit.

Circuits of the second type, although permitting operation of the transistor in the saturation region, involve the application of a separate turn-off pulse of opposite polarity from the turn-on pulse or the switching into the base circuit at turn-off time of a direct-current biasing potential. Another method of this type employs a driving pulse having a trailing edge cutting the zero axis.

Both types of prior art circuits require either additional direct-current bias sources or bi-directional driving pulses and thus unnecessarily encumber the basic switching circuit.

A principal object of this invention is to reduce the "turn-off" time in transistor switching circuits.

A corollary object of the invention is to reduce the fall time of the output pulse in transistor switching circuits.

In accordance with the invention, reactive means are connected in the base-to-emitter path of a transistor operated in common-emitter configuration for rapidly sweeping the excess current carriers from the base region after the termination of the driving pulse. In an illustrative embodiment described in detail below, an inductor connected in shunt with the base-to-emitter path is charged by the driving current pulse and, because the counter E.M.F. appearing across the inductor is of a polarity which tends to maintain the current flow therein in the same direction, is discharged through the base-to-emitter path in the reverse direction at the termination of the driving pulse.

The invention is thus seen to have the advantage of extreme simplicity. Bias both for turning on and turning off the transistor switching element is derived solely from the driving pulses.

A feature of the invention is that no separate sources of direct-current bias potential are required. The only potential source required is that connected through a proper current limiting resistor to the collector of the switching transistor.

Figure 2:
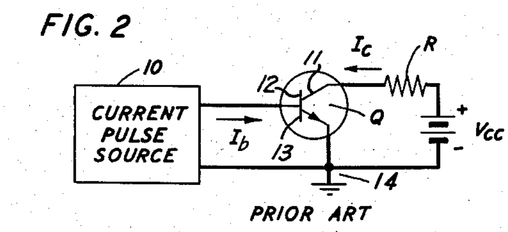
Figure 3:
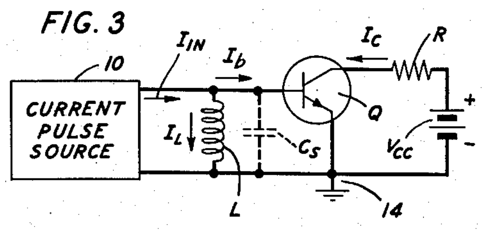
Figure 4:
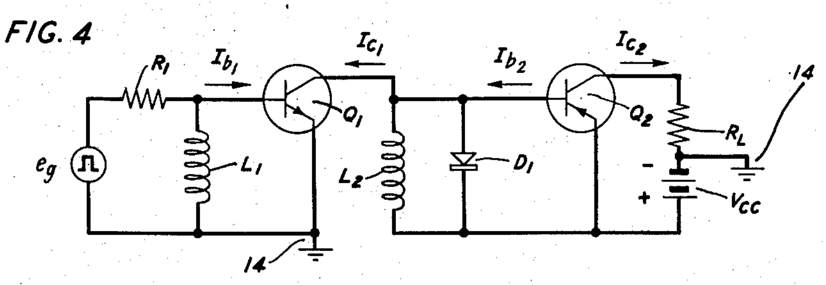

Additional advantages and objects of this invention will become apparent from a consideration of the following specification including the single sheet of drawings in which Figs. 1A, 1B, 1C, 1D, 1E and 1F are waveforms of aid in understanding the invention;

Fig. 2 is a schematic diagram of the basic switching circuit for which compensation is to be provided; and Figs. 3 and 4 are schematic diagrams of switching circuits embodying principles of the invention.

Figure 1D:
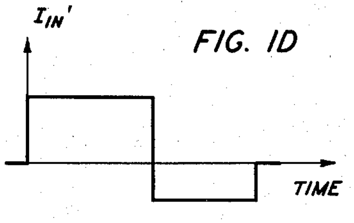
Figure 1B:
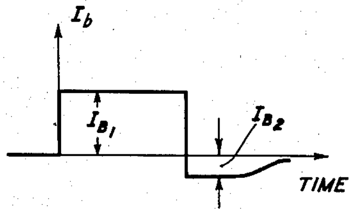
Figure 1E:
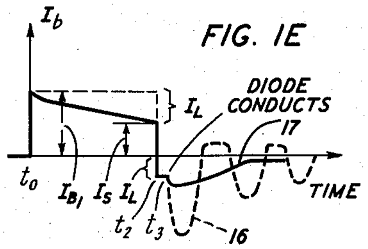
Figure 1C:
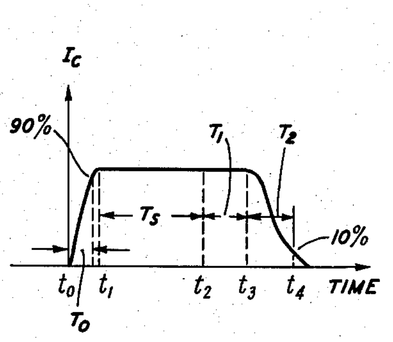

Figs. 1A, 1B, 1C, 1D, 1E and 1F are waveforms drawn to a common time scale illustrative of the problem involved in using transistors as switching devices. Figs. 1B and 1C are taken from a study of the switching operation of junction transistors by John L. Moll published in volume 42, number 12, of the Proceedings of the Institute of Electrical Engineers, dated December 1954 and entitled "Large-Signal Transient Response of Junction Transistors." This article points out that with a junction transistor connected as a switch of a type disclosed in a copending application of P. A. Reiling, Serial No. 410,924, filed February 17, 1954, now Patent No. 2,922,151, and reproduced in this application as Fig. 2, the output pulse response to a driving pulse idealized in Fig. 1A is as shown in Fig. 1C.

In Fig. 2 the n–p–n transistor Q, has a base electrode 12 associated with a region of p-type semiconductor material (the majority current carriers in this this region are therefore positively charged holes) and emitter and collector electrodes 13 and 11 associated with regions of n-type material (the majority current carriers in these regions are negatively charged electrons). Emitter 13 is connected to a ground point 14 and is common, therefore, to both input and output circuits. The output load R is connected to the collector 11 and a source of potential $V_{cc}$ whose negative terminal is grounded. Load R may, for example, be a magnetic memory device on which it is desired to impress a "write" or "read" pulse.

As is well known in the transistor art, a positive current pulse $I_{in}$ such as that of Fig. 1A, impressed on the base-to-emitter junction of an n–p–n transistor, such as transistor Q, by pulse source 10 biases that junction into the low resistance condition and causes a drift of electrons across the junction into the base region. These electrons then diffuse into the base region, some combining with the holes therein, but the majority reach the collector junction and, under the influence of the positive potential on the collector electrode, drift to that electrode. The resultant collector current flows in the load R. Conventional current flow is indicated in Fig. 2 by the arrows marked $I_b$ for flow into the base and $I_c$ for current flow into the collector. Fig. 1B shows the actual base current $I_b$ where $I_{B1}$ is the forward current due to the driving pulse $I_{IN}$ and $I_{B2}$ is the small reverse current due to a small negative potential developed across the base-to-emitter junction as the excess current carriers slowly flow from the base region at the termination of the driving pulse.

Fig. 1A shows the idealized driving pulse applied to the base, an amplified version of which it is desired to reproduce in the collector circuit. Moll shows in the above-cited article that the output wave of an uncompensated transistor differs greatly from the input wave in the matter of rise time, fall time, and duration. In Fig. 1C the rise time of the output pulse is the time between $t_0$ and $t_1$. $T_0$ designates the effective rise or "turn-on" time to 90% of maximum amplitude and is principally determined by internal parameters of the base-to-collector junction. At time $t_1$, collector current saturation is reached and maintained by the input pulse until time $t_2$. This interval is designated $T_s$. At time $t_2$ the base current is suddenly reduced to zero and the "turn-off" transient begins. As is seen in Fig. 1C, the collector current does not decay appreciably until a finite time $T_1$ later. The interval $T_1$ between times $t_2$ and $t_3$ is due to the storage of excess minority current carriers (in this case, electrons) in the base region. Finally at time $t_3$ the "stored" carriers have passed from the base region ($I_{B2}$ in Fig. 1B decays to zero level) and normal decay commences. The interval $T_2$ between times $t_3$ and $t_4$ is the decay time to 10% of saturation amplitude. Fig. 1C is approximately to scale and it is seen that the effective fall time $T_1+T_2$, can be commensurate with the on-time $T_s$, a very undesirable condition.

A switching circuit in accordance with this invention overcomes the disadvantage of the prior art circuits by producing a sharp turn-off from a commonly available rectangular driving pulse at maximum efficiency. Reactive means in the input circuit of the transistor effectively produce a driving pulse of the general form of that idealized in Fig. 1D from the standard unipolar pulse shown in Fig. 1A. It is known from the prior art that a driving pulse $I_{IN}$ of the form shown in Fig. 1D is adequate for reverse biasing the transistor during the turn-off interval.

Fig. 3 is illustrative of a circuit in accordance with the invention in which the basic switching circuit of Fig. 2 is improved by the addition of a small inductor L in shunt with the base-to-emitter path of transistor Q.

Figure 1F:
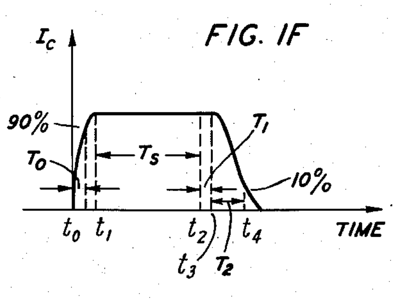

The operation of the circuit of Fig. 3 is as follows. Initially a driving current pulse $I_{IN}$ as shown in Fig. 1A is applied to the base from pulse source 10. The sudden rise in base current causes rapid saturation in transistor Q as the collector current $I_c$ jumps to its saturated value as shown in Fig. 1F in the interval $T_0$. If the amplitude of the driving pulse is greater than the current $I_s$ necessary to produce saturation, the interval $T_0$ in Fig. 1F becomes less than that in Fig. 1C.

When transistor Q has become saturated the small positive voltage at the base 12 causes a downward flow of current $I_L$ (the difference between the maximum base current $I_{B1}$ and the instantaneous current $I_b$) through the inductor L and by the termination of the driving pulse an appreciable fraction of the current in base 12 has been diverted to inductor L. It is seen in Fig. 1E that the base current $I_b$ decays exponentially as current is diverted to the inductor L. At the termination of the driving pulse at time $t_2$, no more current flows into the base 12 or inductor L. The current $I_L$ in inductor L, however, cannot change or cease instantaneously. Therefore, the current continues to flow downward through the inductor to draw reverse current from the only remaining path, the emitter-to-base junction of transistor Q, during the interval $t_2$ to $t_3$ in Fig. 1E. Thus, the inductor current momentarily applies the required reverse bias to the base of the transistor and quickly sweeps the base free of the excess current carriers which would otherwise be stored there. The storage time $T_1$ (Fig. 1F) is thus reduced to negligible proportions and the fall time $T_2$ of the output pulse is determined solely by the internal capacity and resistance of the collector junction.

Since it is desirable to sweep the excess current carriers from the base as rapidly as possible, the reverse base current from the inductor must be large. It is desirable that the inductor still carry some current when the last current carriers have been eliminated from the base region. At the same time, the time constant of the inductor and the internal resistance of the pulse generator must not be so fast as to allow the base current to fall below the level $I_s$ (indicated in Fig. 1E) during the on-time of the driving pulse. The base current must then drop quickly to zero, thereby developing a large negative voltage at the base of transistor Q. This negative voltage charges the distributed capacitance $C_s$ (shown by the dashed lines in Fig. 3) of the inductor and the base-to-emitter capacitance and may result in a damped oscillation between this capacitance and the inductance of the inductor as shown by dotted curve 16 in Fig. 1E.

If the capacitance $C_s$ is of any appreciable magnitude, the positive swings of this oscillation may be of sufficient amplitude to turn the transistor on repeatedly until the oscillation is completely damped. (The flattened tops of the oscillation wave 16 are caused by the turning on of the transistor.) Therefore, it may be desirable to connect a diode (such as diode $D_1$ in Fig. 4) in shunt with the inductor but poled toward the base so that the initial negative-going transient following time $t_3$ in Fig. 1E is shunted to ground. A semiconductor diode, for example, a silicon alloy junction diode of the type described in application Serial No. 211,212, filed February 16, 1951, and now U.S. Patent No. 2,714,702, issued August 2, 1955, to W. Shockley, and having a characteristic such that the forward resistance does not become small until the forward voltage exceeds a certain minimum value is desirable. All semiconductor diodes have this characteristic to a certain extent but the characteristic is more pronounced in diodes made of silicon. With this type of diode no current flows until after the transistor is off. With the diode functioning the oscillation is effectively damped after time $t_3$ as shown by solid curve 17 in Fig. 1E.

All of the foregoing discussion has concerned n-p-n transistors specifically, but the same principle applies as well to p-n-p types provided that all polarities of potential sources, and input and output pulses are reversed.

Fig. 4 shows a two-stage direct-coupled pulse-amplifying circuit suitable for developing an output pulse of 160-milliampere amplitude and six-microsecond duration. Two transistors $Q_1$ and $Q_2$ having complementary symmetry are used so that only one potential source $V_{cc}$ (+9.0 volts in the illustrative example) is necessary and direct coupling may be employed. Both $Q_1$ and $Q_2$ are connected with A.-C. grounded emitters. $Q_1$ is an n-p-n type (Bell Telephone Laboratories type A-1853, for example) and $Q_2$ is of the p-n-p type (Bell Telephone Laboratories type M-1778, for example). Inductors $L_1$ (0.5 millihenry) and $L_2$ (2.0 millihenries) are connected in accordance with this invention in shunt with the base-to-emitter paths of $Q_1$ and $Q_2$ respectively. Input pulse $I_{IN}$ is of the form of Fig. 1A having an amplitude of seven milliamperes and a duration of six microseconds. A voltage pulse source $e_g$ in series with a resistor $R_1$ (1000 ohms) equivalent to a constant current source may be used as shown in the figure. The initial rise of the input pulse switches $Q_1$ to the low impedance condition and causes a current $I_{c1}$ to be drawn from the base of $Q_2$. Since $Q_2$ is of opposite conductivity type from $Q_1$, this withdrawal of current switches $Q_2$ likewise to its high conductance or "on" condition, and causes a high saturation current $I_{c2}$ to flow out of the collector of $Q_2$. An effective combined current gain of 23 produces an output pulse of 160-milliampere amplitude.

Inductors $L_1$ and $L_2$ function just as previously described and at the termination of the driving pulse, excess current carriers are quickly eliminated from the base regions of $Q_1$ and $Q_2$ and the desired fast fall time results. No damping diode was found necessary in the first stage because the positive transient was not large enough to cause spurious switching, but with the greater drive on $Q_2$ diode $D_1$ was required for stable operation. Rise and fall times in the improved circuit were found to be less than one microsecond whereas a fall time of three to four microseconds had previously been experienced without the inductors. Had anti-saturation circuits of the prior art been used, an output of 160-milliampere amplitude would have been unobtainable from a single transistor.

The value of the inductor required for satisfactory operation may be determined to a rough approximation by the following computation. From Fig. 1E it is seen that the value of the current in the inductor at any time $t$ after the application of the driving pulse at amplitude $I_{IN}$ is equal to $$I_{IN}\left(1-e^{-\frac{R}{L}t}\right) \qquad (1)$$

where:

R=effective resistance of the charging path to inductor L;

L=inductance of inductor L;

$t$=charging time measured from the start of the driving pulse; and $e$=the base of natural logarithms.

From the previous discussion it is apparent that in order to have sufficient current $I_L$ stored in the inductor at the termination of the driving pulse, the amplitude of the driving pulse must exceed the base current $I_s$ necessary to maintain the transistor in saturation by the amount $I_L$. Therefore, $$I_L=I_{IN}-I_s \qquad (2)$$

If the duration T of the driving pulse is used to evaluate Equation 1, then $$I_L=I_{IN}-I_s=I_{IN}\left(1-e^{-\frac{R}{L}T}\right) \qquad (3)$$

Equation 3 can be solved for L to yield (letting $ln$= logarithm to the base $e$, and log=logarithm to the base ten)

$$L=\frac{RT}{lnI_{IN}-ln(I_{IN}-I_s)}=\frac{RT}{lnI_{IN}-lnI_L}=\frac{2.3RT}{\log I_{IN}-\log I_L} \qquad (4)$$

In the illustrative example of Fig. 3 the following typical circuit values may be expected: $R$=50 ohms, $V_{cc}$=9 volts; and current gain of $Q$=20. Saturation collector current therefore is 9/50=180 milliamperes. Base current $I_s$ to maintain saturation collector current is then 180/20=9 milliamperes. Choose $I_{IN}$ greater than this: say, 11 milliamperes. It then follows that $I_L$ is 2 milliamperes. Assume further a driving pulse of six-microsecond width and a charging path resistance of 1000 ohms.

Substitution of these values in Equation 4 yields $L$=10.3 millihenries.

It has been found that in practice inductors of somewhat smaller value in the range of 0.5 to 5.0 millihenries give adequate performance under actual circuit conditions, and in fact the value of the inductance is not critical from the standpoint of transistor substitution.

Where necessary, the time constant with a given inductor can be increased by adding a resistor in series with the inductor. This expedient may be of advantage when the duration of the driving pulse is long. For with the series resistor added the inductor charges to a value asymptotic to a value other than the zero axis.

It is to be understood that the above-described arrangements are merely illustrative of the application of the principles of the invention. For example, the principles of the invention are also applicable to point-contact transistors. Numerous other embodiments will be apparent to those skilled in the art without departing from the spirit and scope of the invention.

What is claimed is:

1. In combination, a source of substantially rectangular pulses, a load circuit, means for switching the pulses from said source to said load, said means including a junction transistor comprising base, emitter and collector electrodes, said base being associated with a region of semiconductive material, said transistor being held cut-off to withhold current from said load in the absence of input pulses, said pulses having an amplitude sufficient to drive said transistor into a condition of collector current saturation, said base region tending during the collector current saturation condition to store excess current carriers and thereby to introduce a finite delay in the transistor change from saturation to cut-off, said delay tending further to introduce a correspondingly extended decay time in the pulse current in said load, and means for sweeping the excess current carriers from said base region at each transistor change from saturation to cut-off to reduce substantially the decay time of the pulse current in said load comprising non-resonant reactive means connected to said pulse source and across said base and emitter electrodes and having current flowing thereinto from said pulse source in one direction during each input pulse, and upon the termination of each last-mentioned input pulse, said reactive means having current continuing momentarily to flow thereinto in said one direction from the emitter-base junction of said transistor for applying a momentary reverse bias to said base.

2. The combination in accordance with claim 1 in which said reactive means comprises an inductor connected in parallel with the output of said pulse source and across said base and emitter electrodes, said pulse source having a predetermined magnitude of internal resistance and said inductor having a predetermined time constant for holding the current flow in said base to at least a preselected amount during each input pulse but permitting said last-mentioned base current to drop rapidly to zero upon the termination of the input pulse thereby developing the momentary reverse bias applied to said base electrode.

3. The combination in accordance with claim 1 in which said reactive means is an inductor having a value of inductance so chosen that the time constant of said inductor and the effective resistance of the path for the current flowing into said inductor permit an amount of current to flow into said inductor in response to each input pulse to sweep said excess current carriers from said base region at the termination of each input pulse.

4. The combination in accordance with claim 2 in which a distributed capacitance comprising the inherent capacitance of said inductor and said base-to-emitter junction tends to be charged by said base reverse voltage and thereby provides a damped oscillation in response to each input pulse, and which includes a unilaterally conducitng device connected in shunt with said inductor and poled in a direction toward said base electrode to render ineffective the forward-biasing portions of said oscillation.

5. The combination in accordance with claim 4 in which said unilaterally conducting device is composed of a silicon alloy junction having such a resistance-voltage characteristic that the forward resistance does not become small until the forward voltage attains a predetermined magnitude, said device precluding current flow therethrough until said transistor is changed from saturation to cut-off.

6. In combination, a junction transistor having base, emitter and collector electrodes, a source of substantially rectangular pulses having an amplitude sufficient to drive said transistor between collector current saturation and cut-off, means for applying said pulses between said base and emitter electrodes, a load connected across said collector and emitter electrodes, said collector being driven to current saturation in response to input pulses and to current cut-off in the absence of input pulses, and means for accelerating the transition from collector current saturation to collector current cut-off comprising a nonresonant reactive impedance connected in shunt of the output of said pulse source, said impedance also having one terminal connected to said base and a second terminal to said emitter, means for storing current in said impedance in response to said pulses, and means connecting said impedance to release the current stored in said impedance through a path including said base and emitter at the termination of each of said pulses.

7. The combination in accordance with claim 6 in which said transistor has a base region characterized by the accumulation of excess current carriers therein in response to said collector current, and said impedance has a reactance proportioned to store sufficient current derived directly from each of said pulses to accelerate the removal of said current carriers from said base region by its release of current therefrom substantially concurrently with the termination of each of said pulses.

8. A current pulse amplifier comprising first and second junction transistors of opposite conductivity types, each including base, emitter and collector electrodes, means for direct coupling the collector electrode of said first transistor to the base electrode of said second transistor, means for connecting the emitter electrode of said first transistor to ground, a source of substantially rectangular input pulses having an amplitude capable of driving said first transistor into saturation, means for connecting said source to the base and emitter electrodes of said first transistor, a single source of direct-current potential, a load, means for connecting said potential source and said load in series between the collector and emitter electrodes of said second transistor, means for grounding the common connection between said potential source and said load, said potential source being so poled as to apply a reverse bias to the base-collector junction of said second transistor, thereby holding said second transistor in a non-conducting state in the absence of an input pulse, said first transistor being driven into saturation in response to each input pulse, said second transistor being driven into saturation in response to saturation in said first transistor and thereby establishing a current flow in said load, and means for applying a transitory reverse bias to the base-emitter junction of each of said transistors immediately at the termination of each said driving pulses and thereby sweeping of excess current carriers which tend to be stored in the base region of each of said transistors when collector current saturation therein is reached, said last-mentioned means comprising two inductors, each having its two opposite terminals connected to the base-to-emitter junction of one of said first and second transistors.

9. The amplifier according to claim 8 in which said second transistor is a p-n-p type and which includes a semiconductor diode connected in shunt of said inductor having its opposite terminals connected to said base-to-emitter junction of said second transistor, said diode being poled in a direction toward said emitter of said last-mentioned transistor.

References Cited in the file of this patent

UNITED STATES PATENTS

| | | |
|---|---|---|
| 2,594,336 | Mohr | Apr. 29, 1952 |
| 2,681,996 | Wallace | June 22, 1954 |
| 2,736,765 | Lohman et al. | Feb. 28, 1956 |
| 2,854,589 | Ingham | Sept. 30, 1958 |
| 2,897,378 | Jones | July 28, 1959 |
| 2,912,597 | Sziklai et al. | Nov. 10, 1959 |

FOREIGN PATENTS

| | | |
|---|---|---|
| 736,760 | Great Britain | Sept. 14, 1955 |

OTHER REFERENCES

Article "The Transistor Regenerative Amplifier as a Computer Element," by Chapin, Proc. of the Inst. of Elec. Eng., vol. 101, part III, No. 73, October 1954, pages 298 to 307.